US008359486B2

(12) United States Patent
Huang et al.

(10) Patent No.: US 8,359,486 B2
(45) Date of Patent: Jan. 22, 2013

(54) HIGH SPEED INPUT/OUTPUT SYSTEM AND POWER SAVING CONTROL METHOD THEREOF

(75) Inventors: Po-Yao Huang, Hsinchu County (TW); Chien-Ting Wang, Taichung County (TW)

(73) Assignee: Faraday Technology Corp., Hsin-Chu (TW)

( * ) Notice: Subject to any disclaimer, the term of this patent is extended or adjusted under 35 U.S.C. 154(b) by 293 days.

(21) Appl. No.: 12/783,813

(22) Filed: May 20, 2010

(65) Prior Publication Data

US 2011/0231685 A1    Sep. 22, 2011

(30) Foreign Application Priority Data

Mar. 18, 2010    (TW) .................................. 99108050 A

(51) Int. Cl.
G06F 1/26    (2006.01)
(52) U.S. Cl. ......... 713/321; 713/300; 713/310; 713/320
(58) Field of Classification Search .................. 713/300, 713/310, 320, 321
See application file for complete search history.

(56) References Cited

U.S. PATENT DOCUMENTS

| | | | | |
|---|---|---|---|---|
| 6,434,643 | B1 * | 8/2002 | Ejiri ................................ | 710/58 |
| 6,839,778 | B1 * | 1/2005 | Sartore et al. .................... | 710/60 |
| 8,095,698 | B2 * | 1/2012 | Santhanam et al. ............. | 710/15 |
| 2006/0085653 | A1 * | 4/2006 | Bollinger et al. .............. | 713/300 |
| 2009/0199022 | A1 * | 8/2009 | Fukuda .......................... | 713/300 |
| 2010/0211701 | A1 * | 8/2010 | Townsend ....................... | 710/16 |
| 2011/0150137 | A1 * | 6/2011 | Lin et al. ....................... | 375/316 |

* cited by examiner

Primary Examiner — Kim Huynh
Assistant Examiner — Zahid Choudhury
(74) Attorney, Agent, or Firm — Winston Hsu; Scott Margo

(57) ABSTRACT

A high speed input/output (HSIO) system and a power saving control method for the HSIO system are provided. The HSIO system has a plurality of transmission speed modes. When an external device is connected to the HSIO system and an auto-configuration link is completed, the power saving control method forcibly sets an interface controller to any desired transmission speed specification in accordance with an actual transmission speed of to-be-transmitted data. Therefore, transmission speed mode of a single physical layer can be changed to achieve a low power transmission.

14 Claims, 3 Drawing Sheets

HIGH SPEED INPUT/OUTPUT SYSTEM AND POWER SAVING CONTROL METHOD THEREOF

CROSS-REFERENCE TO RELATED APPLICATION

This application claims the priority benefit of Taiwan application serial no. 99108050, filed on Mar. 18, 2010. The entirety of the above-mentioned patent application is hereby incorporated by reference herein and made a part of specification.

BACKGROUND OF THE INVENTION

1. Field of the Invention

The present invention relates generally to a high speed input/output (HSIO) system such as Universal Serial Bus (USB), Serial Advanced Technology Attachment (SATA), Peripheral Component Interconnection express (PCIe), or the like, and more particularly, to a power saving control method for the HSIO system.

2. Description of Related Art

In conventional analog serial high speed input/output (HSIO) systems, the physical layer (PHY) has been designed as a current-drive type. Once an external device is connected to the HSIO and an auto-configuration link is completed, the transmission speed mode of the PHY is set as a fixed value. Therefore, the HSIO system (e.g. USB, SATA, PCIe, or the like) consumes almost the same power within the unit time during data transmission regardless of the data transmission speed. In other words, in the conventional PHY technology, the same drive current is always consumed within the unit time at different data transmission speeds.

In the conventional HSIO technology, adjustment or improvement of the power consumption has been considered regardless of the data rate of the transmitted data. Many high speed transmission applications are starting to use the HSIO systems. However, the new generation HSIO system increases significantly in power consumption. For example, the rated transmission speed of USB3.0 is about 10 times the rated transmission speed of USB2.0 but the power consumption of USB3.0 is about 5 times the power consumption of USB2.0, as shown in Table 1 below. The rated transmission speed of SATA 6G is about twice the transmission speed of SATA 3G but the power consumption of SATA 6G is about 3.5 times the power consumption of SATA 3G, as shown in Table 2 below. The rated transmission speed of PCIe 5G is about twice the rated transmission speed of PCIe 2.5G but the power consumption of PCIe 5G is about 3.75 times the power consumption of PCIe 2.5G, as shown in Table 3 below.

TABLE 1

Comparison among USB 1.1, USB 2.0 and USB 3.0

| USB version | | Max transmission speed | Transmission power |
|---|---|---|---|
| USB 1.1 | Low speed | 1.5 Mbps | ≈125 kB/s | ≈15 mW/s |
| | Full speed | 12 Mbps | ≈1 MB/s | ≈30 mW/s |
| USB 2.0 | High speed | 480 Mbps | ≈40 MB/s | ≈60 mW/s |
| USB 3.0 | Super speed | 5 Gbps | ≈400 MB/s | ≈300 mW/s |

[Note]
Transmission power values in Table 1 may vary with different PHY design.

TABLE 2

Comparison among SATA 1.5 G, SATA 3 G and SATA 6 G

| SATA version | | Max transmission speed | Transmission power |
|---|---|---|---|
| SATA 1.5 G | 1.5 Gbps | ≈150 MB/s | ≈70 mW/s |
| SATA 3 G | 3 Gbps | ≈300 MB/s | ≈100 mW/s |
| SATA 6 G | 6 Gbps | ≈600 MB/s | ≈350 mW/s |

[Note]
Transmission power values in Table 2 may vary with different PHY design.

TABLE 3

Comparison among PCIe 2.5 G, PCIe 5 G and PCIe 8 G

| PCIe version | Max transmission speed | Transmission power |
|---|---|---|
| PCIe 2.5 G | 2.5 Gbps | ≈250 MB/s | ≈80 mW/s |
| PCIe 5 G | 5 Gbps | ≈500 MB/s | ≈300 mW/s |
| PCIe 8 G | 8 Gbps | ≈800 MB/s | ≈450 mW/s |

[Note]
Transmission power values in Table 3 may vary with different PHY design.

The increase in power consumption is more apparent when the HSIO system is used in a low data transmission speed device with higher speed transmission mode. In fact, the actual transmission speed of the transmission interface is usually subjected to the speed of the device itself and the rate of the file data format or function (e.g. MP3 playback or voice recording function). As a result, when the new generation HSIO system is set in the high speed mode, the transmission time is, in many cases, reduced only a little or even is not reduced, but the transmission power consumption increases significantly.

Taking SATA as an example (other HSIO systems have the similar problem), when the actual device data rate makes the high speed SATA 6G unable to bring its advantage of high transmission speed, the interface transmission power consumption of the high speed SATA 6G is much greater than that of the low speed SATA 1.5G. For example, Table 4 is a comparison table showing the comparison between SATA 6G and SATA 1.5G each transmitting same 8G data when the actual max device transmission speed (bottleneck speed) is 200 MB/s.

TABLE 4

Comparison between SATA 6G and SATA 1.5 G

| Data amount (Max Device transmission speed is 200 MB/s) | | Transmission time | Transmission power consumption |
|---|---|---|---|
| 8 GB | SATA 1.5 G | 53.3 s | 3.73 W |
| | SATA 6 G | 40 s | 14 W |

It can be clear From Table 4 that, if the actual device transmission speed is too low, the interface transmission power consumption of the high speed SATA 6G is much greater than that of the low speed SATA 1.5G. However, the conventional HSIO system does not dynamically switch its transmission speed mode according to the actual transmission speed of the data transmission. The transmission speed mode of the conventional HSIO system is already determined during an initial process at the time an external device is connected to a host. Once determined during the initial process, the transmission speed mode of the conventional HSIO system is fixed. That is, in determining the transmission speed mode of the conventional HSIO system, neither the actual data transmission speed nor the issue of transmission power consumption is considered.

SUMMARY OF THE INVENTION

Accordingly, the present invention provides a high speed input/output (HSIO) system and a power saving control method thereof that can dynamically switch the transmission speed of the HSIO system according to the actual transmission speed of the data transmission.

One embodiment of the invention provides a power saving control method of a HSIO system. The HSIO system has a plurality of transmission speed modes. The power saving control method includes estimating an actual transmission speed of a data transmission. If the data transmission is of performance-priority, one transmission speed mode is selected from the plurality of transmission speed modes as a target mode where a rated transmission speed of the selected transmission speed mode is greater than and approximate to the actual transmission speed of this data transmission. Configuration setting of an interface controller is triggered to control a physical layer to switch to the target mode.

One embodiment of the present invention further provides a HSIO system with power saving control. The HSIO system has a plurality of transmission speed modes. The HSIO system includes a physical layer, an interface controller, and a main processor. The main processor estimates an actual transmission speed of a data transmission. If the data transmission is of performance-priority, the main processor selects one from the plurality of transmission speed modes as a target mode where a rated transmission speed of the selected transmission speed mode is greater than and approximate to the actual transmission speed of this data transmission. The interface controller is connected between the main processor and the physical layer. The interface controller performs configuration setting of the physical layer according to the target mode selected by the main processor to control the physical layer to switch to the target mode.

In some embodiments of the present invention, the main processor calculates power consumptions of transmitting a same amount of data in the respective transmission speed modes and selects one with the lowest power consumption from the multiple transmission speed modes as the target mode if the data transmission is of power-priority.

In view of the foregoing, in embodiments of the present invention, the specification of the interface controller 220 and the physical layer 230 can be arbitrarily changed to control the selection of different transmission speed for data transmission. Thus, the HSIO system of the above embodiments can dynamically switch the transmission speed of the physical layer to a most suitable target mode to thereby minimize power.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
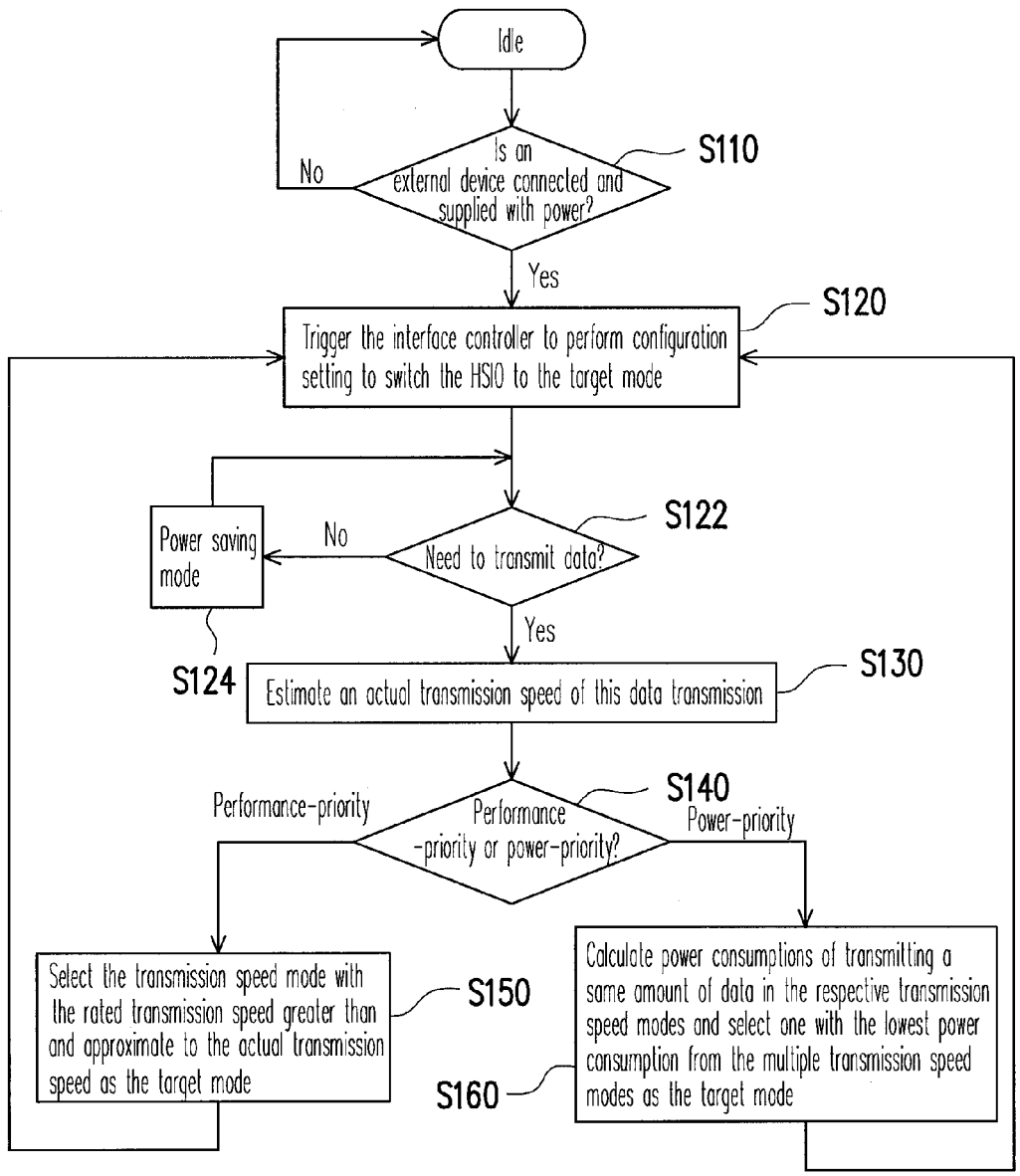
FIG. 1 is a flow chart of a power saving control method for a high speed input/output (HSIO) system according to one embodiment of the present invention.

FIG. 1 is a flow chart of a power saving control method for a high speed input/output (HSIO) system 200 according to one embodiment of the present invention. The power saving control method of the present embodiment comprises steps S110 to S160. The HSIO system 200 has a plurality of transmission speed modes. Taking USB as an example, the USB transmission speed modes include a USB1.1 low speed mode, a USB1.1 full speed mode, a USB2.0 high speed mode, and a USB3.0 super speed mode. Taking SATA as an example, the SATA transmission speed modes include a 1.5G mode, a 3G mode, and a 6G mode. Taking PCIe as an example, the PCIe transmission speed modes include a 2.5G mode, a 5G mode, and an 8G mode.

Figure 2:
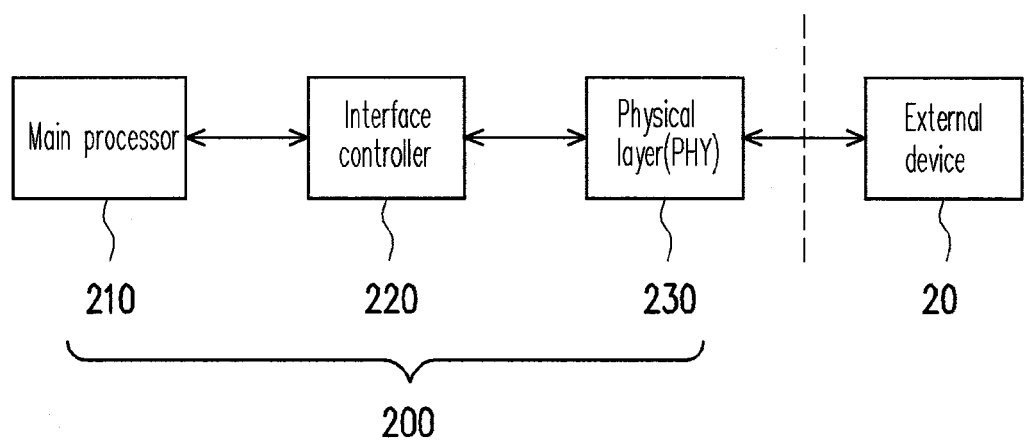
FIG. 2 is a functional block diagram illustrating the HSIO system with power saving control according to one embodiment of the present invention.

FIG. 2 is a functional block diagram illustrating the HSIO system 200 with power saving control according to one embodiment of the present invention. The HSIO system 200 of a host includes a main processor 210, an interface controller 220, and a physical layer 230. The main processor 210 may be a central processing unit (CPU), a digital signal processor (DSP), a micro-controller, a micro-processor, a programmable logic device (PLD), a complex programmable logic device (CPLD), a field programmable gate array (FPGA), or an applied specific integrated circuit (ASIC), depending upon the specific application of the host.

Referring to FIG. 1 and FIG. 2, the interface controller 220 performs step S220 to check whether an external device 20 is connected to the physical layer 230 of the host. Under the condition that the interface controller 220 and the physical layer 230 are supplied with power, the interface controller 220 is able to check whether the external device 20 is connected to the physical layer 230. If the external device 20 is not connected to the physical layer 230, the physical layer 230 maintains at an idle state. Once the external device 20 is connected to the physical layer 230, the interface controller 220 performs an auto-configuration link process (step S120) to set corresponding parameters to the physical layer 230 according to the external device 20. The auto-configuration link process includes configuration setting, i.e. selecting/determining one target mode from a plurality of transmission speed modes.

Next, the interface controller 220 performs step S122 to determine whether the main processor 210 needs to transmit data. If the main processor 210 does not need to transmit data, the interface controller 220 enters a power saving mode specified by respective HSIO (e.g. USB, SATA, PCIe) systems (step S124). When the main processor 210 needs to transmit data, i.e. needs to transmit data to the external device 20, the main processor 210 may estimate the actual speed of this data transmission (step S130). In general, the main processor 210 can estimate the actual data transmission speed based on the demand of the quality of service (QoS), the amount of transmitted data, the type of the external device 20 or other parameters of this data transmission. According to the QoS demand, the main processor 210 can determine whether this data transmission is of performance-priority or power-priority (step S140). In some embodiment, if the HSIO system 200 is fixed in the performance-priority mode, step S160 can be omitted.

If the data transmission is of performance-priority, the main processor 210 can select one transmission speed mode from the plurality of transmission speed modes as the target mode where a rated transmission speed of the selected transmission speed mode is greater than and approximate to the actual transmission speed of this data transmission (step S150).

Figure 3:
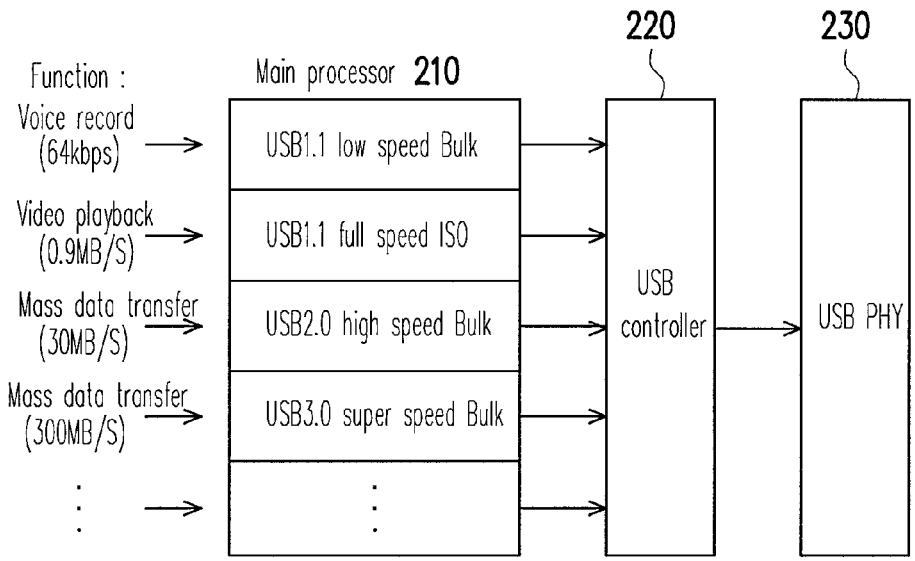
FIG. 3 illustrates the HSIO system of FIG. 2 which forcibly sets the interface controller according to the actual data transmission speed under an exemplary USB environment.

FIG. 3 illustrates the HSIO system 200 of FIG. 2 which forcibly sets the interface controller according to the actual data transmission speed under an exemplary USB environment. In the case of a voice record operation of the system with a 64 Kbps of QoS demand, the main processor 210 may select from Table 1 the USB1.1 low speed Bulk mode as the target mode. In the Bulk mode, data accuracy is a priority during data transmission. In the case of a video playback of the system with a 0.9 MB/s of QoS demand, the main processor 210 may select from Table 1 the USB1.1 full speed ISO mode as the target mode. In the ISO mode, timeliness of the data is a priority during data transmission. In the case of a mass data transfer of the system with a 30 MB/s of QoS demand, the main processor 210 may select from Table 1 the USB2.0 high speed Bulk mode as the target mode. In the case of a mass data transfer of the system with a 300 MB/s of QoS demand, the main processor 210 may select from Table 1 the USB3.0 supper speed Bulk mode as the target mode.

Figure 4:
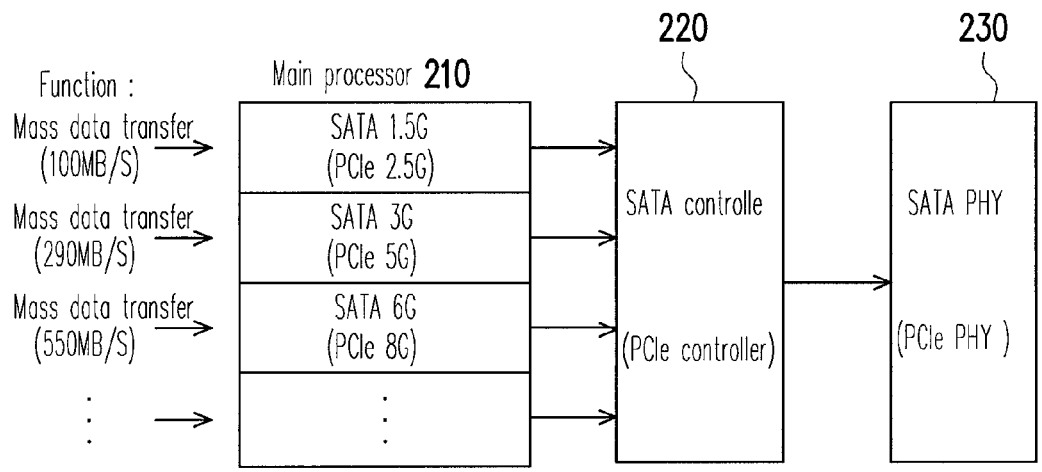
FIG. 4 illustrates the HSIO system of FIG. 2 which forcibly sets the interface controller according to the actual data transmission speed under an exemplary SATA (or PCIe) environment.

FIG. 4 illustrates the HSIO system 200 of FIG. 2 which forcibly sets the interface controller according to the actual data transmission speed under an exemplary SATA (or PCIe) environment. In the case of mass data transfer of the system with a 100 MB/s of QoS demand, the main processor 210 may select from Table 2 the SATA 1.5G mode (or from Table 3 the PCIe 2.5G mode) as the target mode. In the case of a mass data transfer of the system with a 290 MB/s of QoS demand, the main processor 210 may select from Table 2 the SATA 3G mode (or from Table 3 the PCIe 5G mode) as the target mode. In the case of a mass data transfer of the system with a 550 MB/s of QoS demand, the main processor 210 may select from Table 2 the SATA 6G mode (or from Table 3 the PCIe 8G mode) as the target mode.

The main processor 210 may then transmit the target mode information to the interface controller 220. After the main processor 210 triggers the interface controller 220, the interface controller 220 performs the configuration setting of the physical layer 230 according to the target mode selected by the main processor 210 at step S120, such that the HSIO system 200 is switched to the selected target mode at step S150.

If the data transmission is of power-priority, the main processor 210 may perform step S160 to calculate power consumptions of this data transmission in the respective transmission speed modes, i.e. the power consumptions of transmitting the same amount of data in the respective transmission speed modes. For example, the main processor 210 may obtain the time for transmitting the data amount in the respective transmission speed modes by dividing the to-be-transmitted data amount by the rated transmission speeds (or max transmission speeds) of the respective transmission speed modes. The main processor 210 may then obtain the power consumptions in the respective transmission speed modes by multiplying the time for transmitting the data amount in the respective transmission speed modes by the transmission power of the respective transmission speed modes. The main processor 210 then selects one transmission speed mode with the lowest power consumption from the multiple transmission speed modes as the target mode.

Taking the USB as an example (referring to Table 1), assuming the to-be-transmitted data amount is 8 GB, the low speed mode power consumption is (8 GB÷125 kB/s)×15 mW/s≈960 W, the full speed mode power consumption is (8 GB÷1 MB/s)×30 mW/s≈240 W, the high speed mode power consumption is (8 GB÷40 MB/s)×60 mW/s≈12 W, the super speed mode power consumption is (8 GB÷400 MB/s)×300 mW/s≈6 W. As such, the main processor 210 may select the USB3.0 super speed mode as the target mode.

The above selection is made in an ideal environment without the bottleneck speed. Taking the USB as an example (referring to Table 1), assuming the bottleneck speed is 50 MB/s and the to-be-transmitted data amount is 8 GB, the low speed mode power consumption is (8 GB÷125 kB/s)×15 mW/s≈960 W, the full speed mode power consumption is (8 GB÷1 MB/s)×30 mW/s≈240 W, the high speed mode power consumption is (8 GB÷40 MB/s)×60 mW/s≈12 W, and the super speed power consumption is (8 GB÷50 MB/s)×300 mW/s≈48 W. As such, the main processor 210 may select the USB2.0 high speed mode as the target mode.

The main processor 210 may then transmit the target mode information to the interface controller 220. After the main processor 210 triggers the interface controller 220, the interface controller 220 performs the configuration setting of the physical layer 230 at step S120 according to the target mode selected by the main processor 210, such that the HSIO system 200 is switched to the selected target mode at step S160.

The interface controller 220 may be triggered by the main processor 210 by writing the target mode information to specific registers of the interface controller 220 via a bus. The configuration setting of the physical layer 230 may be performed by the interface controller 220 through a specific control interface. Taking the USB as an example, the main processor 210 may write the target mode information to the DEV_EN register and SPEED_CTRL register of the interface controller 220 via the bus. If the logic value of the DEV_EN register is "0", this indicates that the configuration setting should not be triggered. Therefore, the interface controller 220 does not change the transmission speed mode of the USB physical layer (USB PHY, i.e. the physical layer 230) regardless of the content in the SPEED_CTRL register. If the logic value of the DEV_EN register is "1", the interface controller 220 changes the transmission speed mode of the physical layer 230 according to the content in the SPEED_CTRL register. For example, if the logic value of the DEV_EN register is "1" and the content of the SPEED_CTRL register is "00", "01", "10", or "11", the interface controller 220 sets the physical layer 230 as "low speed", "full speed", "high speed", or "super speed".

In the present embodiment, taking the USB as an example, the interface controller 220 may perform the configuration setting of the physical layer 230 through a PHY Interface for the PCI Express and USB3.0 (PIPE) and a USB2.0 Transceiver Macrocell Interface (UTMI). In other embodiments, the interface controller 220 and the physical layer 230 may be connected through a UTMI Low Pin Interface (ULPI) or a Serial Link PHY Interface (SLPI).

For example, if the interface controller 220 sends a "RxTermination" instruction logic "0" to the physical layer 230 through the PIPE and sends an "XCVRSELECT" instruction logic "10" to the physical layer 230 through the UTMI, then the transmission speed mode of the physical layer 230 is set to USB1.1 low speed mode. If the RxTermination instruction and the XCVRSELECT instruction the interface controller 220 sends to the physical layer 230 are logic "0" and logic "01", respectively, and the interface controller 220 sends a "TERMSELECT" instruction logic "1" to the physical layer 230 through the UTMI, then the transmission speed mode of the interface layer 230 is set to the USB 1.1 full speed mode. If the RxTermination instruction, XCVRSELECT instruction, and TERMSELECT instruction the interface controller 220 sends to the physical layer 230 are logic "0", logic "00", and logic "0", respectively, then the transmission speed mode of the physical layer 230 is set to the USB2.0 high speed mode. If the RxTermination instruction and the XCVRSELECT instruction the interface controller 220 sends to the physical layer 230 are logic "1" and logic "00", respectively, then the transmission speed mode of the physical layer 230 is set to the USB3.0 super speed mode.

Taking SATA as another example, the main processor 210 may write the target mode information into the PHY_RESET register and the SPEED_CTRL register of the interface controller 220 via the bus. If the logic value of the PHY_RESET register is "1", this indicates that the configuration setting should not be triggered (or the physical layer should not be reset). Therefore, the interface controller 220 does not change the transmission speed mode of the SATA physical layer (SATA PHY, i.e. the physical layer 230) regardless of the content of the SPEED_CTRL register. When the logic value of the PHY_RESET register is "0", the interface controller 220 changes the transmission speed mode of the physical layer 230 according to the content of the SPEED_CTRL register. For example, if the logic value of the HPY_RESET register is "0" and the content of the SPEED_CTRL register is "00", "01" or "10", then the interface controller 220 sets the physical layer 230 as "1.5 Gbps", "3 Gbps", or "6 Gbps" via a SATA PHY Interface Specification (SAPIS). After the interface controller 220 is triggered, the interface controller 220 performs a link-up process to the physical layer 230 for corresponding configuration setting.

Taking PCIe as a further example, the main processor 210 may write the target mode information into the DEV_EN register and the SPEED_CTRL register of the interface controller 220 via the bus. If the logic value of the DEV_EN register is "0", this indicates that the configuration setting should not be triggered (or the physical layer should not be reset). Therefore, the interface controller 220 does not change the transmission speed mode of the PCIe physical layer (PCIe PHY, i.e. the physical layer 230) regardless of the content of the SPEED_CTRL register. When the logic value of the DEV_EN register is "1", the interface controller 220 changes the transmission speed mode of the physical layer 230 according to the content of the SPEED_CTRL register. For example, if the logic value of the DEV_EN register is "1" and the content of the SPEED_CTRL register is "00", "01" or "10", then the interface controller 220 sets the physical layer 230 as "2.5 Gbps", "5 Gbps", or "8 Gbps". After the interface controller 220 is triggered, the interface controller 220 sends a "TxElecIdle" instruction, a "Rate" instruction, and a "PowerDown" instruction through the PIPE to perform a link-up process to the physical layer 230 for corresponding configuration setting, and the physical layer 230 sends back "PhyStatus" information to the interface controller 220 through the PIPE. Thus, PCIe finishes switching the transmission speed mode.

It is noted that the HSIO system 200 of the present embodiment has only one single physical layer 230. However, the HSIO system 200 can have multiple physical layers in other embodiments. Taking the USB3.0 as an example, the HSIO system 200 may include two physical layers, i.e. a USB2.0 physical layer and a PCIe 5G physical layer. According to the target mode set by the main processor 210, the interface controller 220 may select the "USB1.1 low speed", "USB1.1 full speed", or "USB2.0 high speed" mode of the USB2.0 physical layer, as well as the "PCIe 2.5G" or "PCIe 5G" mode of the PCIe 5G physical layer.

The steps S130 to S150/S160 of the above embodiment may be implemented by software to switch the physical layer transmission speed mode to a suitable mode to control the power consumption. The power saving control method is applied in an independent physical layer architecture in the above embodiment. As analog serial HSIO physical layers are of a current-drive type, the HSIO (e.g. USB, SATA, PCIe, or the like) system consumes the same power within the same unit time during data transmission regardless of the data transmission speed. As such, the power-saving control method of the above embodiment can improve the conventional technology in which data transmission at different transmission speeds always consumes the same driving current. Once the external device is connected to the HSIO system and the auto-configuration link is completed, the power saving control method of the above embodiments forcibly sets the interface controller to any desired transmission speed specification according to the actual speed of the to-be-transmitted data, thus achieving a low power data transmission.

In summary, in the above embodiments, the specification of the interface controller 220 and the physical layer 230 can be arbitrarily changed to control the selection of different transmission speed for data transmission. Thus, the HSIO system of the above embodiments can dynamically switch the transmission speed of the physical layer to a most suitable target mode to thereby save power.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A power saving control method for a high speed input/output (HSIO) system, the HSIO system having a plurality of transmission speed modes, the power saving control method comprising:
   estimating an actual transmission speed of a data transmission, wherein the actual data transmission speed is estimated based on a demand of a quality of service (QoS);
   determining whether the data transmission is of performance-priority or power-priority according to the demand of the QoS;
   if the data transmission is of performance-priority, selecting one transmission speed mode from the plurality of transmission speed modes as a target mode where a rated transmission speed of the selected transmission speed mode is greater than and closest to the actual transmission speed of this data transmission;
   triggering configuration setting of an interface controller to control a physical layer to switch to the target mode; and
   calculating power consumptions of transmitting a same amount of data in the respective transmission speed modes and selecting one with the lowest power consumption from the multiple transmission speed modes as the target mode if the data transmission is of power-priority.

2. The power saving control method of a HSIO system according to claim 1, further comprising:
   checking whether an external device is connected to the physical layer; and
   performing an auto-configuration link process by the interface controller if the external device is connected to the physical layer, the auto-configuration link process comprising the configuration setting.

3. The power saving control method of a HSIO system according to claim 1, wherein the HSIO system is Universal Serial Bus (USB), Serial Advanced Technology Attachment (SATA), or Peripheral Component Interconnection express (PCIe).

4. The power saving control method of a HSIO system according to claim 1, wherein the HSIO system is USB, and the transmission speed modes include a low speed mode, a full speed mode, a high speed mode, and a super speed mode.

5. The power saving control method of a HSIO system according to claim 1, wherein the interface controller performs the configuration setting via a USB Transceiver Macrocell Interface (UTMI), a UTMI Low Pin Interface, or a Serial Link PHY Interface to set the physical layer.

6. The power saving control method of a HSIO system according to claim 1, wherein the interface controller performs the configuration setting via an PHY Interface for the PCI Express to set the physical layer.

7. The power saving control method of a HSIO system according to claim 1, wherein the interface controller performs the configuration setting via a SATA PHY Interface Specification to set the physical layer.

8. A high speed input/output (HSIO) system with power-saving control, the HSIO system having a plurality of transmission speed modes, comprising:
   a main processor adapted for estimating an actual transmission speed of a data transmission based on a demand of a quality of service (QoS), and for determining whether the data transmission is of performance-priority or power-priority according to the demand of the QoS, wherein if the data transmission is of performance-priority, the main processor selects one from the plurality of transmission speed modes as a target mode where a rated transmission speed of the selected transmission speed mode is greater than and closest to the actual transmission speed of this data transmission;
   a physical layer;
   an interface controller connected between the main processor and the physical layer, wherein the interface controller performs configuration setting of the physical layer according to the target mode selected by the main processor to control the physical layer to switch to the target mode; and
   the main processor calculates power consumptions of transmitting a same amount of data in the respective transmission speed modes and selects one with the lowest power consumption from the multiple transmission speed modes as the target mode if the data transmission is of power-priority.

9. The HSIO system with power-saving control according to claim 8, wherein the interface controller is adapted for checking whether an external device is connected to the physical layer and performing an auto-configuration link process if the external device is connected to the physical layer, the auto-configuration link process comprising the configuration setting.

10. The HSIO system with power-saving control according to claim 8, wherein the HSIO system is Universal Serial Bus (USB), Serial Advanced Technology Attachment (SATA), or Peripheral Component Interconnection express (PCIe).

11. The HSIO system with power-saving control according to claim 8, wherein the HSIO system is USB, and the transmission speed modes include a low speed mode, a full speed mode, a high speed mode, and a super speed mode.

12. The HSIO system with power-saving control according to claim 8, wherein the interface controller performs the configuration setting via a USB Transceiver Macrocell Interface (UTMI), a UTMI Low Pin Interface, or a Serial Link PHY Interface to set the physical layer.

13. The HSIO system with power-saving control according to claim 8, wherein the interface controller performs the configuration setting via an PHY Interface for the PCI Express to set the physical layer.

14. The HSIO system with power-saving control according to claim 8, wherein the interface controller performs the configuration setting via a SATA PHY Interface Specification to set the physical layer.

* * * * *